Patented June 30, 1942

2,287,949

UNITED STATES PATENT OFFICE 2,287,949

VITAMIN E SUBSTITUTE AND PROCESS OF MAKING IT

Lee Irvin Smith and Herbert E. Ungnade, Minneapolis, Minn., assignors to Regents of the University of Minnesota, Minneapolis, Minn., a corporation of Minnesota No Drawing. Application July 14, 1939, Serial No. 284,460

5 Claims. (Cl. 260—479)

This invention relates to new chemical compounds and to methods for producing the same. More particularly, the invention relates to mono- and di-allyl substituted phenols.

We have discovered that when phenol is reacted with an alkyl-substituted allyl halide, under appropriate reaction conditions, allyl-substituted phenols are obtained.

It is, therefore, an object of the present invention to provide the aforementioned method for producing the described compounds.

It is also an object of the invention to utilize any exhibited effect of the herein described processes and/or products and to utilize such processes and/or products in their known or hereafter discovered capacities. For example, certain of these new compounds have been found to exhibit biological activity comparable to that of naturally-occurring substances, and it is, therefore, an important object of this invention to provide a method for utilizing such activity.

According to the work of Evans, Emerson and Emerson, Journal of Biological Chemistry, vol. 113, page 321 (1936) when certain naturally occurring substances are included in the diet, the procreative metabolism of the individual is rendered normal, whereas when the diet does not include these factors the procreative function is inhibited. Thus when properly conditioned female test animals are fed a diet which does not include certain naturally occurring substances, the reproduction is inhibited or completely nullified, whereas when the same animals are returned to a diet including the proper naturally occurring substances, normal reproduction is resumed.

Accumulated evidence has indicated that the ordinary diets of many animals and humans are deficient in naturally occurring biological control factors, and has indicated the necessity of including diet supplement or corrective factors to offset such deficiencies. It has therefore been customary to utilize extracts or fractions of naturally occurring substances for such additive diet correction factors in the diets of humans and animals.

The use of naturally occurring compounds for diet corrective purposes has been restricted due to the cost of the natural substances, the difficulty encountered in concentrating the active factors without deteriorating them, instability of the concentrates for use due to rapid oxidation when exposed to air, and many similar difficulties. As a consequence, the use of naturally occurring substances has been restricted.

According to the present invention, dietary control and correction may be accomplished readily and with certainty by the use of phenol compounds, more specifically a di-o-alkyl substituted allyl phenol, or its esters such as the acetate, propionate, palmitate and the like, and it is therefore an object of the present invention to provide a dietary control factor comprising the diallyl phenol compound.

More particularly, it is an object of the invention to provide a dietary control factor or medicinal agent comprising a di-o-alkyl- substituted allyl phenol or its esters such as the acetate, propionate, palmitate, and the like.

It is another object of the present invention to provide a method of diet control involving the use of the di-allyl phenol compound, or its esters such as the acetate, propionate, palmitate, and the like.

It is also an object of the invention to provide a foodstuff or medicinal agent including a phenol, more particularly a di-o-alkyl- substituted allyl phenol, or its esters such as the acetate, propionate, palmitate, and the like.

According to the present invention, biological control is accomplished by adding to the diet of the individual a regulated dosage of a phenol, preferably o-di-α-ethyl-crotyl phenol, and its esters having the following structural formula:

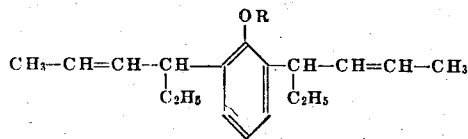

in which R is hydrogen or any acyl group.

The biological effectiveness of o-di-α-ethyl-crotyl-phenol for influencing biometabolism is illustrated by the actions upon test animals. Thus when o-di-α-ethyl-crotyl-phenol was fed in 50 mg. doses to standardized conditioned female test rats, litters of live young were produced thus demonstrating that the phenol compound has the same biological control effect of natural vitamin E. Furthermore, the phenol compound, being perfectly stable in air, retains its effectiveness over long periods of time, and is therefore especially desirable for use.

The phenol compound employed, preferably o-di-α-ethyl-crotyl-phenol, is a viscous oil and for controlling biometabolism is added to the ordinary die, or taken separately as a medicament. Thus cereal foodstuffs such as granulated grain mixed feeds or dry mash type cattle and poultry feeds may be fortified by the addition of a small proportion of the phenol compound, o-di-α-ethyl-crotyl-phenol, or one of the aforementioned esters, which is mixed into the cereal foodstuff. This is preferably accomplished by first thoroughly mixing about one part of the phenol compound with several parts of cereal to form a dry concentrate, and then adding and mixing the concentrate with the main body of cereal foodstuff.

Where the diet corrective function may best be carried out by administration of concentrates, it is preferable to form the phenol compound into tablets or enclose it in suitable capsules.

In some instances, it is desirable to use a fluid concentrate for addition to foodstuffs such as cereal feeds or for direct administration in fluid form. For such modes of utilization the phenol compound may be carried by an oil such as olive oil, edible mineral oil, butter oil and other similar edible fats and oils.

According to our invention, when phenol, an alkali metal carbonate such as potassium carbonate, and an alkyl-substituted-allyl halide are reacted in the presence of an organic solvent, such as acetone, a mixture is obtained comprising mono- and di-allyl phenols, and a phenyl ether, and the various fractions are separated. The di-allylation product is thus obtained.

In the following example the process of our invention is illustrated as applied to the production of o-di-α-ethyl-crotyl-phenol. However, the example is not to be construed as limiting the scope of the invention herein claimed, as it will be apparent to those skilled in the art that other alkyl-substituted-allyl phenols may be similarly prepared, by appropriate selection of the reactants employed, etc.

*Example*

180 gms. of phenol, and 268 gms. of potassium carbonate and 200 cc. of acetone are placed in a flask equipped with a reflux condenser. The mixture is cooled in an ice bath and 229 gms. of 4-chloro-hexene-2 is added. The mixture is then refluxed for eight hours or until a sample tested according to the Beilstein test gives a negative test for halogen. Water and petroleum ether are added to the mixture, the aqueous layer separated and extracted with petroleum ether. The combined petroleum extracts are exhaustively extracted with 10% aqueous alkali and then with Claisen alkali. This reagent is described by Claisen, Annalen, vol. 418, page 96 (1918) as being composed of 350 grams of potassium hydroxide in 250 cc. of distilled water made up to 1 liter with methyl alcohol.

The Claisen alkali extract is diluted with water, acidified with dilute sulfuric acid, extracted with ether, the ether extract dried with anhydrous sodium sulfate and distilled. The product is o-di-α-ethyl-crotyl-phenol; boiling point 169–170° C. at 9 mm. pressure, 60° C. at $10^{-6}$ mm. $n^{20}_D$=1.5223; $D^{20}_{20}$=0.9407. Yield 48 gms.

The petroleum ether extract remaining after the extraction with alkali was washed with water, dried with anhydrous potassium carbonate and distilled in high vacuum. The product is α-ethyl-crotyl-phenyl ether.

The aqueous alkali extract is saturated with carbon dioxide, extracted with ether, the ether extract dried with anhydrous sodium sulphate and distilled. The product is o-α-ethyl-crotyl-phenol.

The use of excess 4-chloro-hexene-2 favors the production of the di-o-α-ethyl-crotyl-phenol.

The allyl-substituted phenols may also be obtained by direct allylation of phenol in the presence of a "nondissociating" solvent, such as benzene, toluene, xylene, or ether.

It is obvious that many variations may be made in the illustrated procedures without departing from the spirit of the invention herein described and claimed.

We claim:

1. O-di-α-ethyl-crotyl-phenol.

2. A process comprising reacting phenol, an alkali metal carbonate, and 4-chloro-hexene-2 in the presence of an organic solvent under refluxing conditions, and separating the formed reaction products.

3. A process comprising reacting phenol, potassium carbonate, and 4-chloro-hexene-2 in the presence of an organic solvent, under refluxing conditions, and separating the thus formed reaction products.

4. A compound having the structure

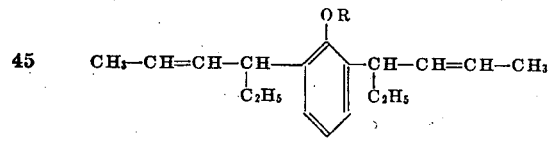

where R is selected from the group consisting of hydrogen and a monobasic carboxylic aliphatic acyl radical.

5. A monobasic carboxylic aliphatic acid ester of O-di-alpha-ethyl-crotyl phenol.

LEE IRVIN SMITH.
HERBERT E. UNGNADE.